United States Patent
Andreasson et al.

(12) 
(10) Patent No.: US 11,964,662 B2
(45) Date of Patent: Apr. 23, 2024

(54) METHOD FOR ALLOCATING POWER BETWEEN ELECTRIC MACHINES IN A POWERTRAIN OF AN ELECTRIC VEHICLE

(71) Applicant: VOLVO TRUCK CORPORATION, Gothenburg (SE)

(72) Inventors: Mattias Andreasson, Gothenburg (SE); Samuel Jakobsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/180,404

(22) Filed: Mar. 8, 2023

(65) Prior Publication Data
US 2023/0303083 A1    Sep. 28, 2023

(30) Foreign Application Priority Data
Mar. 25, 2022   (EP) ..................... 22164481

(51) Int. Cl.
*B60W 10/08*    (2006.01)
*B60W 10/11*    (2012.01)
(Continued)

(52) U.S. Cl.
CPC ............ *B60W 30/19* (2013.01); *B60W 10/08* (2013.01); *B60W 10/11* (2013.01);
(Continued)

(58) Field of Classification Search
CPC ...... B60W 30/19; B60W 10/08; B60W 10/11; B60W 30/18127; B60W 2510/1005;
(Continued)

(56) References Cited

U.S. PATENT DOCUMENTS 1,168,639 A  *  1/1916 Hoyt ................... H05B 41/2827
                                                                200/19.03
9,623,872 B2 *  4/2017 Zhu ...................... F16H 61/0403
(Continued)

FOREIGN PATENT DOCUMENTS

WO          2018224742 A1    12/2018
WO     WO-2021078388 A1 *  4/2021    ............... B60K 1/02

OTHER PUBLICATIONS

Extended European Search Report in corresponding European Application No. 22164481.8 dated Sep. 26, 2022 (8 pages).

*Primary Examiner* — Roger L Pang
(74) *Attorney, Agent, or Firm* — Venable LLP; Jeffri A. Kaminski (57) ABSTRACT

A method for allocating power between electric machines in a powertrain of an electric vehicle is described. The electric vehicle includes a gearbox having an input shaft and an output shaft configured to transmit a first torque to the wheels of the vehicle, a first electric machine having an output shaft coupled to the input shaft of the gearbox, and a second electric machine configured to supply a second torque to wheels of the vehicle. The method comprises: prior to a gear change of the first electric machine, allocating power to the first and second electric machines according to a first power ratio; in response of an intended gear change of the first electric machine, allocating power to the first and second electric machines according to a second power ratio.

14 Claims, 4 Drawing Sheets

(51) Int. Cl.
*B60W 30/18* (2012.01)
*B60W 30/19* (2012.01)

(52) U.S. Cl.
CPC ............... *B60W 30/18127* (2013.01); *B60W 2510/1005* (2013.01); *B60W 2510/104* (2013.01); *B60W 2710/082* (2013.01); *B60W 2710/086* (2013.01)

(58) Field of Classification Search
CPC ..... B60W 2710/082; B60W 2710/086; B60W 2510/104; F16H 2061/0422; F16H 2061/0433
USPC .......................................................... 701/53
See application file for complete search history.

(56) References Cited

U.S. PATENT DOCUMENTS

| | | | |
|---|---|---|---|
| 11,092,220 B1* | 8/2021 | Mancini | ............... F16H 37/0826 |
| 11,267,346 B2 | 3/2022 | Joseph et al. | |
| 11,493,127 B2* | 11/2022 | Chen | ..................... F16H 61/684 |
| 2015/0202964 A1 | 7/2015 | Nefcy et al. | |
| 2015/0298574 A1 | 10/2015 | Bramson | |
| 2016/0375890 A1 | 12/2016 | Saito et al. | |
| 2021/0053549 A1 | 2/2021 | Chen et al. | |
| 2021/0094403 A1* | 4/2021 | Lee | ......................... B60K 1/02 |
| 2022/0134862 A1* | 5/2022 | Lee | ...................... F16H 37/046 475/1 |

* cited by examiner

METHOD FOR ALLOCATING POWER BETWEEN ELECTRIC MACHINES IN A POWERTRAIN OF AN ELECTRIC VEHICLE

TECHNICAL FIELD

The present invention relates to a method for allocating power between electric machines in a powertrain of an electric vehicle. The invention furthermore relates to a controlling apparatus, a powertrain, an electric vehicle, a computer program and a computer readable medium.

The invention may be applied in any powertrain that comprises at least two electric machines, wherein at least one of the electric machines is coupled to a gearbox for suppling a first torque to the wheels of the vehicle. In particular, the invention can be applied in electrically operated heavy-duty vehicles, such as trucks, buses and construction equipment. Although the invention will be described with respect to a fully electrified heavy-duty truck, the invention is not restricted to this particular vehicle, but may also be used in other vehicles such as buses, trailers, wheel loaders, excavators, passenger cars, etc. It is applicable in fully electrically operated vehicles as well as in hybrid vehicles, comprising also a combustion engine.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine. In either way, energy storage devices are used to store the energy needed in order to operate the engine for propelling the vehicle. For an electric machine, the energy storage devices may be batteries or supercapacitors, comprised in an energy storage system, ESS. Both fully electrically operated vehicles and hybrid vehicles may be referred to as electric vehicles.

In an electric vehicle, the electric machine is part of a powertrain which transform energy from the energy storage system to the propelling means, typically the wheels of the vehicle. For this purpose, the powertrain further comprises transmission and drive shafts. In order to control the operation of the engine, and any related actions such as e.g. gear shifting operations, the vehicle comprises a controlling apparatus. For example, in a vehicle comprising an electric machine, the controlling apparatus is configured to control the electric machine driver which is configured to control the operation of the electric machine.

For vehicles comprising at least two electric machines, the control of the corresponding powertrain can become complex, as the multiple electric machines need to cooperate in various operations of the vehicle, e.g. during a gear shifting operation for one of the electric machines Thus, there is a need in the industry for an improved control of the powertrain, in particular during gear shifting operations.

SUMMARY

It is an object of the present invention to at least to some extent alleviate the shortcomings discussed above in relation to known gear shifting operations.

According to at least a first aspect of the present invention, a method for allocating power between electric machines in a powertrain of an electric vehicle, wherein the electric vehicle comprises a gearbox having an input shaft and an output shaft configured to transmit a first torque to the wheels of the vehicle, a first electric machine having an output shaft coupled to the input shaft of the gearbox, and a second electric machine configured to supply a second torque to wheels of the vehicle, is provided. The method comprises:

prior to a gear change of the first electric machine, allocating power to the first and second electric machines according to a first power ratio;

in response of an intended gear change of the first electric machine, allocating power to the first and second electric machines according to a second power ratio, wherein the second power ratio is defined by a reduced allocation of power to the first electric machine and an increased allocation of power to the second electric machine, or an increased allocation of power to the first electric machine and a decreased allocation of power to the second electric machine, as compared to the allocation of power according to the first power ratio.

Hereby, power allocation to the first and second electric machines is improved. In other words, in response of an intended gear change of the first electric machine, the allocated power to one of the first and second electric machines is reduced, and the allocated power to the other one of the first and second electric machines is increased, as compared to the allocated power prior to the intended gear change. Thus, in response of reducing the power allocation for the first or second electric machine, the power allocation for the other one of the first and second electric machines is increased. Hereby, the available power for driving the first and second electric machines (i.e. propulsion power or power used for a gear change), or available power outtake (i.e. regenerative, is well distributed between the first and second electric machines. For example, if a certain propulsion power is needed during the gear change of the first electric machine, the power allocation for the second electric machine can be decisive for the second power ratio, and the power left for the gear change is adapted accordingly. Correspondingly, if a certain time for the gear change of the first electric machine is important, the power allocation for the first electric machine can be decisive for the second power ratio, and the power left for the propulsion is adapted accordingly.

According to at least one example embodiment, allocated power corresponds to power limits set to the first and second electric machines. Thus, prior to the gear change as the first and second electric machines are subject to allocated power according to the first power ratio, power to the first electric machine is controlled by a first power limit and power to the second electric machine is controlled by a second power limit. Thus, the first power ratio is defined as ratio of the first power limit and the second power limit. In response of the intended gear change, as the first and second electric machines are subject to allocated power according to the second power ratio, power to the first electric machine is controlled by a third power limit and power to the second electric machine is controlled by a fourth power limit. The third power limit is different to the first power limit, and the fourth power limit is different to the second power limit.

It should be understood that allocated power may refer to allocated power transferred from, or to, the battery system. That is, the allocated power may refer to as allocation of power usage of the first and second electric machines, or power generated by the first and second electric machines. Thus, the power limits may comprise maximum and minimum power limits, e.g. the maximum power limit referring to the maximum power usage of the first and second electric machines, respectively, and the minimum power limit referring to the maximum possible power regeneration of the first and second electric machines, respectively. Thus, the minimum power limit is typically referring to a maximum possible power regeneration of the first and second electric machines (i.e. a negative value as compared to the maximum power limit).

According to at least one example embodiment, the first and the second electric machines are powered by an energy storage system, ESS, such as a battery system typically comprising one or several battery packages. The ESS is configured to power the first and the second electric machines. Correspondingly, the first and the second electric machines are configured to provide regenerative power to the ESS (e.g. to charge the battery packages). Hence, the power allocation of the first and second electric machines is typically defined in relation to the ESS. The power of the ESS may be determined as, or based on, the State of Power (SoP). The power of the ESS may e.g. be based on a long-term horizon (e.g. over a time period of 20 s). The power from the ESS which is available for the first and second electric machines may preferably be the power which is used for the power allocation of the first and second electric machines is based on.

According to at least one example embodiment, the sum of allocation of power to the first and second electric machines is defined as 100%. Correspondingly, the first and second power ratio may be defined in relation to the sum of allocation of power. For example, the first power ratio may be 40/60 meaning that 40% of the sum of allocation of power is allocated to the first electric machine, and that 60% of the sum of allocation of power is allocated to the second electric machine. Moreover, the second power ratio may be 30/70 meaning that 30% of the sum of allocation of power is allocated to the first electric machine, and that 70% of the sum of allocation of power is allocated to the second electric machine. Stated differently, each power ratio (as the first and second power ratios) is based on a predefined level of power (e.g. a predefined amount of available power for power usage, or a predefined amount of power outtake for the production of regenerative power for the ESS). The power allocated to each one of the first and second electric machine is typically equivalent to a torque (for power usage or power regeneration) of the first and second electric machines.

It should be noted that more than two electric machines may be comprised in the powertrain and included in the method of allocating power between the electric machines. Thus, the allocation of power may be scaled in accordance with the number of electric machines in the powertrain.

According to at least one example embodiment, the first torque to the wheels provided by the gear box is referred to as a primary torque, and the second torque to the wheels provided by the second electric machine is referred to as a secondary torque, or compensatory torque. According to at least one example embodiment, the first torque to the wheels provided by the gear box originates solely from the first electric machine.

According to at least one example embodiment, the change in power allocation from the first power ratio to the second power ratio is achieved by ramping up and/or ramping down the allocated power.

According to at least one example embodiment, the power allocation according to the first power ratio is constant over a first time period, the first time period being at least 2 seconds. Correspondingly, the power allocation according to the second power ratio is constant over a second time period, the second time period being at least 2 seconds, or extending at least during the speed synchronization phase of the gear change. Thus, in a transition time period between the first time period and the second time period, the power allocation is ramped up and/or ramped down to reach the power allocation according to the second power ratio. The transition time period may e.g. be at least 1 second.

According to at least one example embodiment, the power allocation according to the second power ratio is kept during at least a portion of the gear change, such as e.g. at least during the speed synchronization phase of the gear change. However, the step of reducing the allocated power to the first or second electric machine and increasing the allocated power to the other one of the first and second electric machines to reach the second power ratio of allocated power to the first and second electric machines, is performed prior to performing the gear change of the first electric machine.

It should be understood that by stating that the second power ratio is defined by a reduced allocation of power to the first electric machine and an increased allocation of power to the second electric machine, or an increased allocation of power to the first electric machine and a decreased allocation of power to the second electric machine, as compared to the allocation of power according to the first power ratio, the reduced allocation of power to the first electric machine is performed simultaneously with the increased allocation of power to the second electric machine, or that the increased allocation of power to the first electric machine is performed simultaneously with the decreased allocation of power to the second electric machine.

According to at least one example embodiment, the method further comprises:
  determining whether the intended gear change is an upshift or a downshift;
  in response of that the intended gear change is a downshift, accelerating the output shaft of the first electric machine to reach a higher speed of the output shaft of the gearbox, wherein the power used for the acceleration is limited by the allocated power according to the second power ratio.

Hereby, the power used for the gear change is limited by the allocated power according to the second power ratio. Thus, the output shaft of the first electric machine is accelerated to reach the speed of the output shaft of the gear box. According to at least one example embodiment, the power used for the acceleration is decisive for the second power ratio.

According to at least one example embodiment, the method further comprises:
  in response of that the intended gear change is an upshift, decelerating the output shaft of the first electric machine to reach a lower speed of the output shaft of the gearbox, wherein the deceleration of the first electric machine is assimilated as regenerative power.

That is, the first electric machine may provide regenerative power to the ESS during the gear change, and in accordance with the second power ratio. Thus, the output shaft of the first electric machine is decelerated to reach the speed of the output shaft of the gearbox As further alternative, the gear shift may comprise changing the gear to neutral.

According to at least one example embodiment, the second electric machine may provide regenerative power to the ESS, and in accordance with the second power ratio, e.g. during braking in a downhill.

According to at least one example embodiment, the method further comprises:

performing a gear change of the first electric machine;
subsequent to the gear change, allocating power to the first and second electric machines according to a third power ratio, wherein the third power ratio is defined by an increased allocation of power to the first electric machine and a decreased allocation of power to the second electric machine, or a decreased allocation of power to the first electric machine and an increased allocation of power the second electric machine, as compared to the allocation of power according to the second power ratio.

Hereby, power allocation to the first and second electric machines is further improved. In other words, in subsequent to the gear change of the first electric machine, the allocated power to one of the first and second electric machines is reduced, and the allocated power to the other one of the first and second electric machines is increased, as compared to the allocated power during the gear change. Thus, in response of reducing the power allocation for the first or second electric machine, the power allocation for the other one of the first and second electric machines is increased. Hereby, the available power for driving the first and second electric machines (i.e. propulsion power or power used for a gear change), or available power outtake (i.e. regenerative, is well distributed between the first and second electric machines. According to at least one example embodiment, subsequent to the gear change is defined as the finalisation of the speed synchronization phase.

As an alternative example embodiment, subsequent to the speed synchronization phase of the gear change, power is allocated according to the third power ratio. Thus, allocating power to the first and second electric machines according to a third power ratio may be performed subsequent to the speed synchronization phase of the gear change. Hereby, more power may be allocated to the second electric machine for e.g. propulsion of the vehicle, even before the gear change of the first electric machine is complete, as the final steps of the gear change (e.g. gear engagement and/or power ramping up) typically requires very little power (if any). Thus, a decreased allocation of power to the first electric machine and an increased allocation of power the second electric machine, as compared to the allocation of power according to the second power ratio, may be performed during the gear change (subsequent to the speed synchronization phase) to early allocate as much power as possible for the propulsion of the vehicle.

Correspondingly to the first and second power ratios, subsequent to the gear change as the first and second electric machines are subject to allocated power according to the third power ratio, power to the first electric machine is controlled by a fifth power limit and power to the second electric machine is controlled by a sixth power limit. The fifth power limit is different to the third power limit, and the sixth power limit is different to the fourth power limit. Stated differently, the method comprises terminating the allocation of power according to the second power ratio subsequent to the gear change of the first electric machine.

According to at least one example embodiment, the gear change may e.g. comprise performing acceleration or deceleration of the output shaft of the first electric machine and a speed synchronization phase in which the speed of the output shaft of the first electric machine is synchronized with the speed of the output shaft of the gear box. That is, the rpm of output shaft of the first electric machine and rpm of output shaft of the gear box match each other at the end of the speed synchronization phase. Thus, the speed of the first electric machine is changed to reach a target speed of the output shaft of the gear box. The speed synchronization is typically performed over a certain amount of time (described more in detail below).

According to at least one example embodiment, the second power ratio is determined by the amount of power needed for propelling the vehicle and/or by the amount of power needed for performing the gear change.

That is, the amount of power needed for propelling the vehicle may be decisive for the second power ratio, or the amount of power needed for performing the gear change may be decisive for the second power ratio. Thus, provided that the second power ratio is based on a predefined available amount of power, one of the amount of power needed for propelling the vehicle and the amount of power needed for performing the gear change, is decisive for the second power ratio. The power left (also according to the second power ratio) is used for the other one of the propelling the vehicle and for performing the gear change. Thus, the method may comprise determining the amount of power needed for propelling the vehicle and the amount of power needed for performing the gear change, and allocating power to the first and second electric machines according to the second power ratio in response to the determined amount of power needed for propelling the vehicle and the amount of power needed for performing the gear change.

According to at least one example embodiment, the amount of power needed for propelling the vehicle is defined as the amount of power required by the driver for propelling the vehicle during the gear change. Thus, the amount of power needed for propelling the vehicle may be referred to as driver required power or driver-desired power. For example, the amount of power needed for propelling the vehicle is associated with preferred torque to the wheels of the vehicle for propulsion.

According to at least one example embodiment, the method further comprises
  estimating required amount of power needed for propelling the vehicle and required amount of power needed for performing the gear change;
  in response to determining that the required amount of power is limited in relation to available power, performing the step of allocating power to the first and second electric machines according to the second power ratio.

Thus, allocation of power to the first and second electric machines is performed when the available power is limited. As previously mentioned, the amount of power needed for propelling the vehicle or the amount of power needed for performing the gear change may be decisive for the second power ratio. That is, the power is limited in relation to the target gear shift (and target time for performing the gear shift) and preferred torque to the wheels for propulsion.

According to at least one example embodiment, the amount of power needed for performing the gear change is determined by the speed synchronisation required for performing the gear change, and the allocated time for performing the speed synchronisation.

That is, the speed synchronisation required for performing a target gear change being speed synchronization of the output shaft of the first electric machine with the output shaft of the gear box, and the time for performing such speed synchronization, determines the power needed for performing the gear change. Typically, the faster speed synchronization (i.e. shorter speed synchronization phase) the larger power needed for the gear change. Thus, the amount of power needed for performing the gear change may be defined as the amount of power required for performing the gear change at a given time. Typically, known parameters such as e.g. the inertia of the system, and absolute speed of the various shafts are included in the determination of the amount of power required for performing the gear change at a given time. If the power allocated to the first machine during a gear change is lower than the amount of power needed for performing the gear change, the gear change will typically take longer time. However, if the amount of power needed for propelling the vehicle is more important to satisfy than the time for performing the gear change (i.e. the amount of power needed for propelling the vehicle is decisive for the second power ratio), the allocated power to the first electric machine during the gear change may be lower than the amount of power needed for performing the gear change. Thus, the amount of power needed for performing the gear change may be referred to as desired power for achieving the gear change at a predetermined time.

According to at least one example embodiment, the allocated time for performing the speed synchronisation is determined in response to the power needed for propelling the vehicle, such that for a relatively high power needed for propelling the vehicle, the allocated time for performing the speed synchronisation is relatively short, and for a relatively low power needed for propelling the vehicle, the allocated time for performing the speed synchronisation is relatively long.

Thus, the amount of power needed for propelling the vehicle may be decisive for the second power ratio, and the allocated power to the first electric machine for performing the gear shift adapted accordingly.

According to at least one example embodiment, the power for propelling the vehicle is determined in response to the allocated time for performing the speed synchronisation, such that for a relatively fast speed synchronisation of the gear change, the power for propelling the vehicle is relatively low, and for a relatively slow speed synchronisation of the gear change, the power for propelling the vehicle is relatively high.

Thus, the amount of power needed for propelling the vehicle may be decisive for the second power ratio, and the allocated power to the first electric machine for performing the gear shift adapted accordingly, or the allocated power to the first electric machine for performing the gear shift may be decisive for the second power ratio, and the allocated power to the second electric machine for propelling the vehicle is adapted accordingly. In other words, the allocation of power to the first and second electric machines according to the second power ratio is based on the allocated time for performing the gear change and propulsion power.

According to at least one example embodiment, the allocation of power to the first and second electric machines according to the second power ratio is determined in response to the maximum possible power throughput of the first and second electric machines.

Thus, there is no need to allocate more power to the first and second electric machines than the first and second electric machines can use or generate.

According to at least one example embodiment, the allocation of power to the first and second electric machines according to the second power ratio is determined in response to the maximum possible power throughput of the battery, or battery system, being configured to power the first and second electric machines.

According to at least one example embodiment, the second electric machine is configured to supply the second torque to the wheels of the vehicle without being coupled to the input shaft of the gearbox.

Thus, the second electric machine may be by-passed or sidestepped of the gear box. That is, the second electric machine is configured to supply the second torque to the wheels of the vehicle without being coupled to the input shaft of the gearbox. As an alternative, the output shaft of the second electric machine is coupled to the input shaft of the gear box at a fixed ratio.

According to at least one example embodiment, the first and the second electric machines are coupled to a common output shaft configured to transmit torque to the wheels of the vehicle.

According to at least one example embodiment, the first and the second electric machines are coupled to different output shafts configured to transmit torque to the wheels of the vehicle. That is, the first electric machine comprises said first output shaft configured to transmit torque to a first wheel, or a first set of wheels, (via the gearbox) and the second electric machine comprises a second output shaft configured to transmit torque to a second wheel, or a second set of wheels different to said first set of wheels.

According to at least one example embodiment, the second electric machine comprises an output shaft coupled to an input shaft of the gearbox. Thus, both the first and second electric machines may be couple to the input shaft of the gear box, or to different input shafts of the gear box. Thus, the second electric machine may be subject to a gear change in a corresponding way as described for the first electric machine. According to at least one example embodiment, the first electric machine and the second electric machine are directly coupled to the input shaft of the gearbox. For example, the output shaft of the first electric machine (may be referred to as a first machine output shaft) is coupled to the input shaft of the gearbox, and the output shaft of the second electric machine (may be referred to as a second machine output shaft) is coupled to the input shaft of the gearbox, wherein the second machine output shaft is arranged in parallel to the first machine output shaft such that each one of the first and second electric machines may separately drive the input shaft of the gear box.

It should be understood that the input shaft of the gearbox may be any shaft of the gearbox adapted to receive torque from at least the first electric machine during a driving operation of the first electric machine (i.e. when the first electric machine operates as a motor to e.g. propel the vehicle). The input shaft may e.g. be a lay shaft or a countershaft. Thus, the input shaft of the gear box is different from an output shaft or a drive shaft, the latter being configured to transfer torque from the gearbox to a drive arrangement or drive unit, such as e.g. a wheel of a vehicle. Thus, the input shaft of the gear box may be referred to as the input shaft, or input shafts, of the gear box.

According to a second aspect of the present invention, a controlling apparatus for a powertrain of an electric vehicle, the controlling apparatus being configured to carry out the method for allocating power between electric machines in a powertrain of an electric vehicle according to the first aspect of the present invention, is provided.

According to a third aspect of the present invention, a powertrain of an electric vehicle comprising the controlling apparatus of the second aspect of the present invention is provided. The powertrain comprises a gearbox having an input shaft and an output shaft configured to transmit a first torque to the wheels of the vehicle, a first electric machine having an output shaft coupled to the input shaft of the gearbox, and a second electric machine configured to supply a second torque to wheels of the vehicle.

According to a fourth aspect of the invention, an electric vehicle comprising a controlling apparatus according to the second aspect of the invention, or a powertrain according to the third aspect of the invention, is provided.

According to a fifth aspect of the invention, a computer program comprising program code means for performing the steps of the first aspect of the invention, when said program is run on a computer, is provided.

Such computer program may e.g. be implemented in an electronic control unit, ECU, of the vehicle. The ECU may correspond to the controlling apparatus of the second aspect of the invention.

According to a sixth aspect of the invention, a computer readable medium carrying a computer program comprising program code means for performing the steps of the first aspect of the invention, when said computer program is run on a computer, is provided.

Effects and features of the second to sixth aspects of the invention are largely analogous to those described above in connection with the first aspect of the invention. Embodiments mentioned in relation to the first aspect of the invention are largely compatible with the second to sixth aspects of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
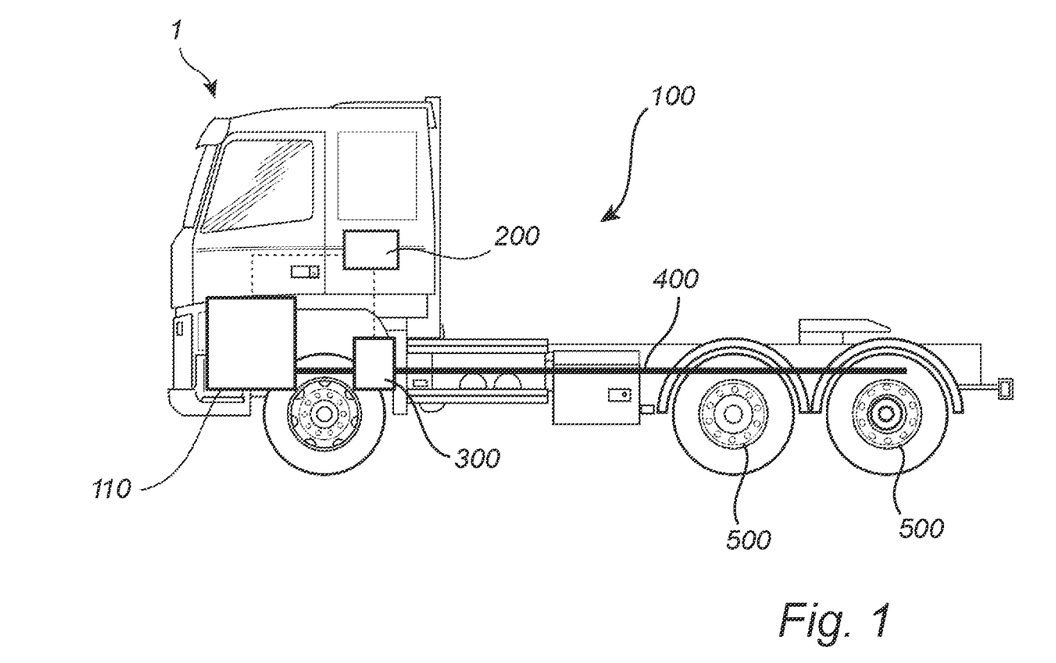
FIG. 1 is a side schematic view of a vehicle comprising a powertrain and a controlling apparatus in accordance with an example embodiment of the invention.

With reference to FIG. 1 a vehicle 1, here embodied as a heavy duty truck 1, is disclosed for which a powertrain 100 with a controlling apparatus 200 of a kind disclosed in the present invention is advantageous. However, the powertrain 100, or controlling apparatus 200, may as well be implemented in other types of vehicles, such as in busses, lightweight trucks, passenger cars, marine applications etc. The vehicle 1 is an electric vehicle, such as a full electric vehicle or a hybrid, wherein the powertrain 100 comprises an electric driveline 110 comprising a battery and a at least two electric machines powered by the battery (shown in FIG. 2). As seen in FIG. 1, the powertrain 100 may further comprise a transmission 300 comprising at least a gearbox, and drive shafts 400 configured to transfer motion to the drive wheels 500.

Figure 2:
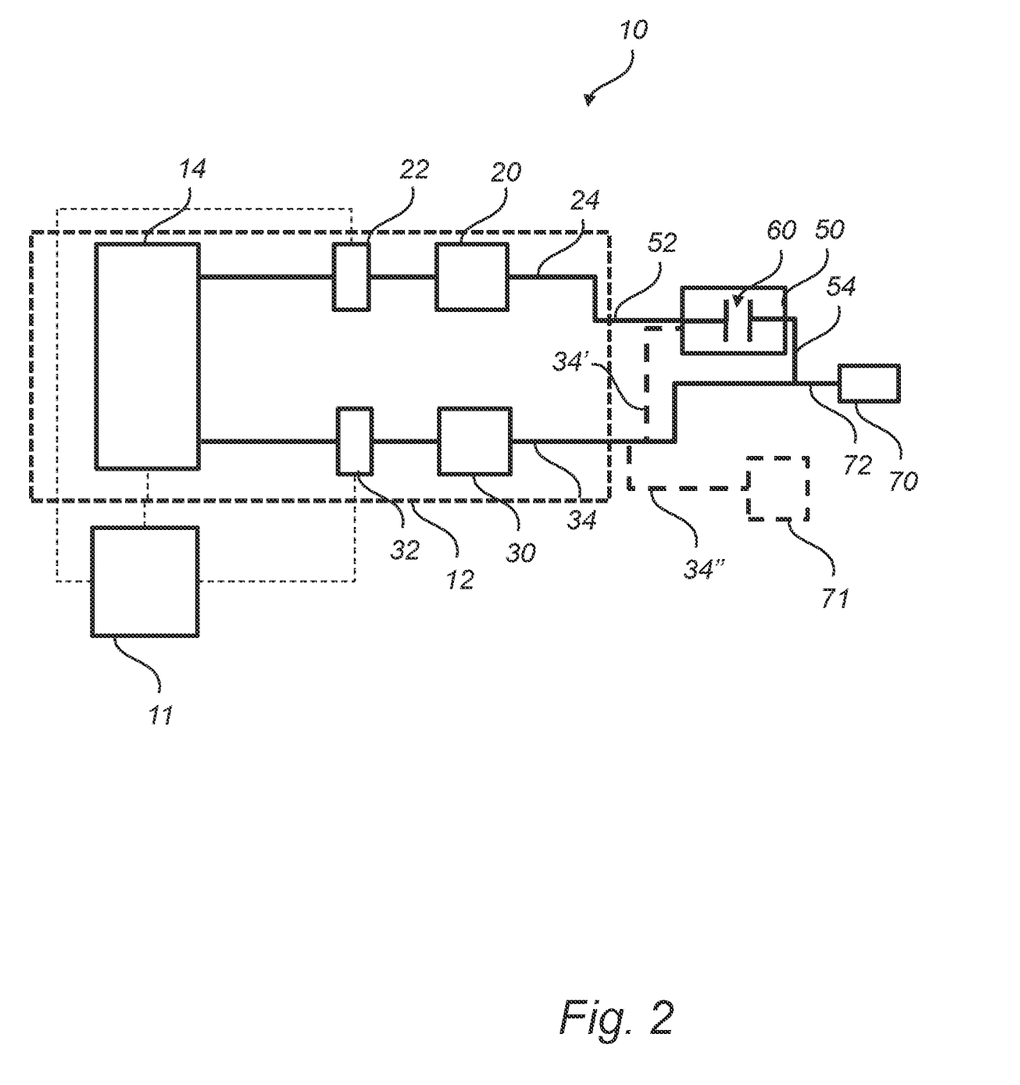
FIG. 2 is a schematic detailed view of a powertrain and a controlling apparatus in accordance with an example embodiment of the invention.

FIG. 2 is a schematic view of a powertrain 10 comprising a battery 14, a first electric machine 20, a second electric machine 30, a controlling apparatus 11 and a gearbox 50. The gear box 50 comprises an input shaft 52 and an output shaft 54 configured to transmit a first torque to the wheels of the vehicle via a first drive arrangement 70. In FIG. 2, the drive arrangement 70 is schematically shown as a simple box but is intended to include any necessary drive shafts and the like for transferring the torque from the gearbox 50 to the drive wheels. In the powertrain 10 of FIG. 2, an output shaft 24 of the first electric machine 20 is coupled to the input shaft 52 of the gearbox (e.g. via a ring gear arrangement or splines) for transmitting the first torque to the wheels and an output shaft 34 of the second electric machine 30 is configured to supply a second torque to wheels of the vehicle via the drive arrangement 70. In FIG. 2, the output shaft 54 of the gear box 50 and the output shaft 34 of the second electric machine 30 are schematically coupled to a common input shaft 72 to the drive arrangement 70. Thus, the second electric machine 30 may be configured to transmit the second torque to the drive arrangement in parallel to the gear box 50. However, according to at least one other alternative embodiment, the output shaft 34 of the second electric machine 30 is coupled to an input shaft of the gear box 50 (e.g. input shaft 52 via a ring gear arrangement together with output shaft 24 of the first electric machine 20), indicated by a first dashed line 34'. For such embodiments, the second electric machine 30 may be subject to a gear change in a corresponding manner as the first electric machine 20. As a further alternative, the output shaft 34 of the second electric machine 30 is coupled to a secondary drive arrangement 71, different to the drive arrangement 70, e.g. in order to transmit torque to a different set of wheels compared to the torque transmitted from the first electric machine 20, indicated by a second dashed line 34". Correspondingly to the drive arrangement 70, the secondary drive arrangement 71 is schematically shown as a simple box but is intended to include any necessary drive shafts and the like for transferring the torque from the second electric machine 30 to the drive wheels.

It should be noted that the battery 14, the first and second electric machines 20, and their respective output shafts 24, 34 may commonly be referred to as an electric drive line 12. Moreover, the first electric machine 20 and the output shaft 24 thereof may be referred to as a first electric drive line, and the second electric machine 30 and the output shaft 34 thereof may be referred to as a second electric drive line. Moreover, the output shaft 24 of the first electric machine 20 may be referred to as a first machine output shaft 24, and the output shaft 34 of the second electric machine 30 may be referred to as a second machine output shaft 34.

In FIG. 2, the gear box 50 is schematically illustrated with a simple clutch 60. However, the gear box 50 typically comprises a plurality of clutches and shafts enabling different gear ratios of the transmission from the first and/or second electric machines to the drive arrangement 70. Correspondingly, the battery 14 is schematically illustrated as a single battery, but is typically a battery system comprising a plurality of battery packs, each battery pack comprising one or more battery units with series connected battery cells.

The operation of the first electric machine 20 is preferably controlled by means of a first machine driver 22, and the operation of the second electric machine 30 is preferably controlled by means of a second machine driver 32. The first and second machine drivers 22, 32 are controlled by the controlling apparatus 11 as indicated in FIG. 2. Each one of the first and second machine drivers 22, 32 may comprise a torque controller and/or a speed controller. Thus, the operation of the first and second electric machines 20, 30 may individually be controlled by means of respective machine driver 22, 32 via the controlling apparatus 11. Moreover, the battery 14 is configured to vary the power transferred to the first and second electric machines 20, 30. In particular, the controlling apparatus 11 is configured to control power management of the battery 14 to allocate, or limit the power transferred to, and from, each one of the first and second electric machines 20, 30, e.g. by controlling the first and second machine drivers 22, 32.

In more detail, the controlling apparatus 11 is configured to, prior to a gear change of the first electric machine 20 (i.e. a change in gear, or in gear ratio, between the output shaft 24 of the first electric machine 20 and the output shaft 54 of the gear box 50), allocate power to the first and second electric machines 20, 30 according to a first power ratio. The term power ratio may be defined as how much of the total available power from the battery 14 is allocated to the first electric machine 20 in relation to how much power that is allocated to the second electric machine 30. Thus, prior to a gear change of the first electric machine 20, the controlling apparatus 11 allocates a first power limit to the first electric machine 20 (e.g. by setting a limit in the first machine driver 22), and allocates a second power limit to the second electric machine 30 (e.g. by setting a limit in the second machine driver 32). For example, the available power of the battery 14 is for a given point in time, or for a time period based on a short-term or long-term horizon (e.g. a period over 20 s), defined as 100% available power. Then the sum of allocation of power to the first and second electric machines 20, 30 may limited to such 100% available power. For example, the first power ratio may be 40/60 meaning that 40% of the available power is allocated to the first electric machine 20, and that 60% of the available power is allocated to the second electric machine 30.

The controlling apparatus 11 is furthermore configured to, in response of an intended gear change of the first electric machine, allocate power to the first and second electric machines 20, 30 according to a second power ratio different to the first power ratio. The second power ratio is defined by a first optional state resulting in a reduced allocation of power to the first electric machine 20 and an increased allocation of power to the second electric machine 30, or a second optional state resulting in an increased allocation of power to the first electric machine 20 and a decreased allocation of power to the second electric machine 30, wherein any increase or decrease in allocation of power is compared to the allocation of power according to the first power ratio.

Figure 3:
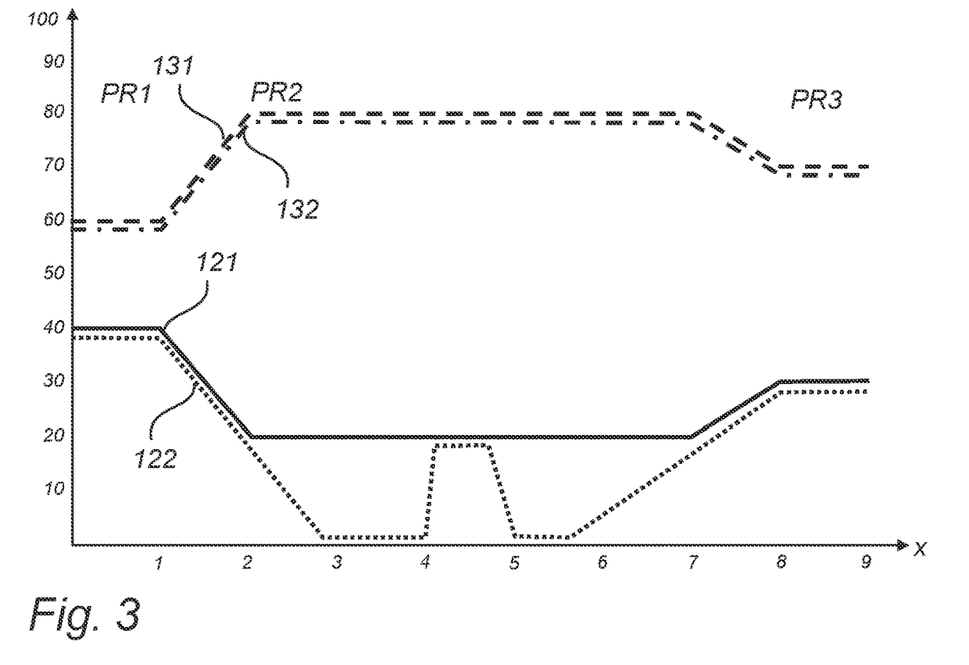
FIGS. 3 and 4 show graphs of allocated power to the electric machines of a powertrain during a gear change operation.
Figure 4:
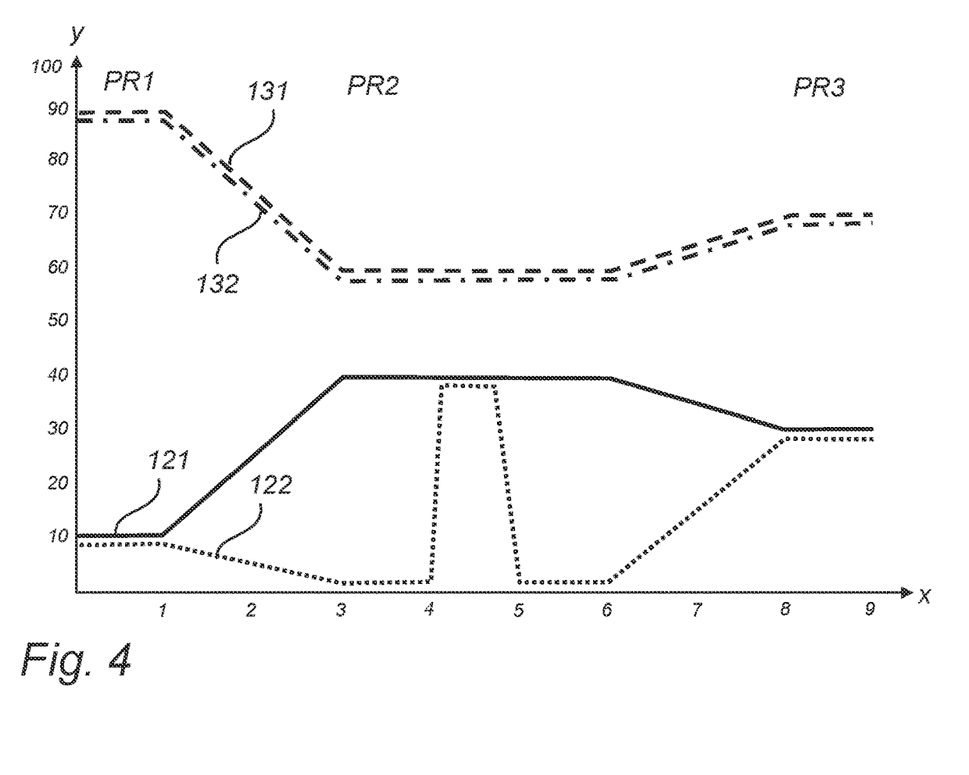

FIGS. 3 and 4 show graphs of allocated power limits to the first and second electric machines 20, 30. In the graphs of FIGS. 3 and 4, the y-axis represents the available power for the first and second electric machines 20, 30, and the x-axis represents time. The available power is here corresponding to that the battery 14, or to the power of the battery 14 which is available for the first and second electric machines 20, 30. The solid line 121 represents the allocated power to the first electric machine 20, i.e. the maximum power which the first electric machine 20 is limited to draw from the battery 14, and the dotted line 122 represents the actual power drawn from the battery 14 of the first electric machine 20. The dashed line 131 represents the allocated power to the second electric machine 30, i.e. the maximum power which the second electric machine 30 is limited to draw from the battery 14, and the dash-dotted line 132 represents the actual power drawn from the battery 14 of the second electric machine 30. The graphs of FIGS. 3 and 4 illustrates a time period in which the first electric machine 20 undergoes a gear change, which will be further described in the following. In the examples of FIGS. 3 and 4, the gear change of the first electric machine is a downshift.

Turning to FIG. 3, prior to the gear change of the first electric machine 20, the power is, by means of the controlling apparatus 11, allocated to the first and second electric machines 20, 30 according to a first power ratio PR1. That is, power to the first electric machine 20 is controlled by a first power limit and power to the second electric machine 30 is controlled by a second power limit, wherein the first power limit to the second power limit defines the first power ratio PR1. In the example of FIG. 3, the first power ratio PR1 is 40/60, meaning that 40% of the power available for the first and second electric machines 20, 30 is allocated to the first electric machine 20, and that 60% of the power available for the first and second electric machines 20, 30 is allocated to the second electric machine 30. In FIG. 3, the controlling apparatus 11 allocates power to the first and second electric machines 20, 30 according to the first power ratio PR1 up to time unit 1, i.e. prior to the intended gear change. During operation of the first and the second electric machines 20, 30 according to power allocation in accordance with the first power ratio PR1, both the first and the second electric machines 20, 30 may propel the vehicle 1 (or drive an auxiliary equipment of the vehicle).

In response of the intended gear change of the first electric machine 20, typically received and acknowledged by the controlling apparatus 11, the power is, by means of the controlling apparatus 11, allocated to the first and second electric machines 20, 30 according to a second power ratio PR2. That is, power to the first electric machine 20 is controlled by a third power limit and power to the second electric machine 30 is controlled by a fourth power limit, wherein the third power limit to the fourth power limit defines the second power ratio PR2. The third power limit is different to the first power limit, and the fourth power limit is different to the second power limit. In the example of FIG. 3, the second power ratio PR2 is 20/80, meaning that 20% of the power available for the first and second electric machines 20, 30 is allocated to the first electric machine and that 80% of the power available for the first and second electric machines 20, is allocated to the second electric machine 30. In FIG. 3, the controlling apparatus 11 allocates power to the first and second electric machines 20, 30 according to the second power ratio PR2 between time unit 2 and time unit 7, i.e. during the gear change. The second power ratio PR2 is in FIG. 3 defined by a reduced allocation of power to the first electric machine 20 (i.e. the third power limit is lower than the first power limit) and an increased allocation of power to the second electric machine 30 (i.e. the fourth power limit is higher than the second power limit), as compared to the allocation of power according to the first power ratio PR1. Thus, as the power allocation to the first electric machine 20 decreases, the power allocation to the second electric machine 30 increases.

The gear change of the first electric machine 20 in the graph of FIG. 3 is as already mentioned a downshift. For a downshift, the output shaft 24 of the first electric machine 20 needs to be accelerated in order to reach the relatively higher speed of the output shaft 54 of the gear box 50 (referred to as speed synchronization). This is shown in FIG. 3 by the dotted line 122 as the gear disengages at time unit 4, and then the subsequent increase in actual power drawn from the battery 14 by the first electric machine 20 in order achieved speed synchronization. As the speed synchronization is reached at time unit 5, the actual power drawn from the battery 14 by the first electric machine 20 is again reduced in order to achieved engagement of the new gear (occurring between time units 5 and 6). Thus, the controlling apparatus 11 is configured to determine whether the intended gear shift is an upshift or a downshift, and in response of that the intended gear change is a downshift, instruct the first electric machine 20 to accelerate the output shaft 24 of the first electric machine 20 to achieve speed synchronization, wherein the power used for the acceleration is limited by the allocated power according to the second power ratio PR2.

During the gear change of the first electric machine 20, the second electric machine 30 is configured to propel the vehicle (by means of the second torque supplied to wheels of the vehicle via the drive arrangement 70 as described with reference to FIG. 2). Hereby, the power available for the first and second electric machines 20, 30, i.e. propulsion power for the second electric machine 30 and power used for the gear change of the first electric machine 20 is well distributed between the first and second electric machines 20, 30. The second power ratio PR2 may for example be determined in response to that a certain propulsion power is needed for the vehicle during the gear change of the first electric machine 20. Thus, the fourth power limit for the second electric machine 30 can be decisive for the setting second power ratio PR2. Hereby, the power left is made available for the gear change of the first electric machine 20, and the gear change is performed in accordance with the power allocation to the first electric machine 20 in accordance with the second power ratio PR2. However, according to an alternative example embodiment, the second power ratio PR2 is determined in response to that a certain power is needed for the gear change of the first electric machine 20. Thus, the third power limit for the first electric machine 20 can be decisive for the setting second power ratio PR2. Hereby, the power left is made available for the propulsion power of the second electric machine 30. The power needed for the gear change may e.g. be determined in response to that a certain time for the gear change of the first electric machine is important, wherein a quicker gear change typically is associated with a higher power needed for the gear change.

Subsequent to the gear change of the first electric machine 20, the power is, by means of the controlling apparatus 11, allocated to the first and second electric machines 20, 30 according to a third power ratio PR3. That is, power to the first electric machine 20 is controlled by a fifth power limit and power to the second electric machine 30 is controlled by a sixth power limit, wherein the fifth power limit to the sixth power limit defines the third power ratio PR3. The fifth power limit is different to the third power limit, and the sixth power limit is different to the fourth power limit. However, the fifth power limit may be the same as the first power limit, and the sixth power limit may be the same as the second power limit (i.e. the third power ratio PR3 may be the same, or corresponding to, the first power ratio PR1). In the example of FIG. 3, the third power ratio PR3 is 30/70, meaning that 30% of the power available for the first and second electric machines 20, 30 is allocated to the first electric machine 20, and that 70% of the power available for the first and second electric machines 20, 30 is allocated to the second electric machine 30. In FIG. 3, the controlling apparatus 11 allocates power to the first and second electric machines 20, 30 according to the third power ratio PR3 subsequently to time unit 7, i.e. subsequently to the gear change. The third power ratio PR3 is in FIG. 3 defined by an increased allocation of power to the first electric machine (i.e. the fifth power limit is higher than the third power limit) and a decreased allocation of power to the second electric machine 30 (i.e. the sixth power limit is lower than the fourth power limit), as compared to the allocation of power according to the second power ratio PR2. Thus, as the power allocation to the first electric machine 20 increases, the power allocation to the second electric machine 30 decreases.

The gear change of the first electric machine 20 in the graph of FIG. 3 is preferably preceded by a ramp down in power allocation to the first electric machine 20. In FIG. 3, this is shown by the decreasing power limit according to the solid line 121 between time units 1 and 2. Correspondingly, subsequent to the gear change, the power allocation is ramped up which is indicated in FIG. 3 by an increasing power limit according to the solid line 121 between time units 7 and 8. In a corresponding manner, the allocated power to the second electric machine 30 is ramped up between time units 1 and 2 (i.e. as power allocation changes from the second power limit to the fourth power limit), and is ramped down between time units 7 and 8.

In FIG. 4 the principally same allocation of power between the first and second electric machines 20, 30 as presented in FIG. 3 is shown, why mainly the differences between the two graphs are described. In FIG. 4, the power is, by means of the controlling apparatus 11, allocated to the first and second electric machines 20, 30 according to the first power ratio PR1 prior to the intended gear change of the first electric machine 20, allocated to the first and second electric machines 20, 30 according to the second power ratio PR2 during the gear change of the first electric machine 20, and allocated to the first and second electric machines 20, 30 according to the third power ratio PR3 subsequent to the gear change. In the graph of FIG. 4, the second power ratio PR2 is set to the time unit 3 instead of as in time unit 2 in the graph of FIG. 3. Moreover, in the graph of FIG. 4, the second power ratio PR2 is defined by an increased allocation of power to the first electric machine 20 (i.e. the third power limit is higher than the first power limit) and a decreased allocation of power to the second electric machine (i.e. the fourth power limit is lower than the second power limit), as compared to the allocation of power according to the first power ratio PR1. Thus, as the power allocation to the first electric machine 20 increase, the power allocation to the second electric machine 30 decreases.

For example, this may be the result of that a certain, relatively high, power is needed for the gear change of the first electric machine 20. Thus, the third power limit for the first electric machine 20 is decisive for the setting second power ratio PR2. Hereby, the power left is made available for the propulsion power of the second electric machine 30.

Thus, subsequent to the gear change in the graph of FIG. 4, the third power ratio PR3 is defined by a decreased allocation of power to the first electric machine 20 (i.e. the fifth power limit is lower than the third power limit) and an increased allocation of power to the second electric machine 30 (i.e. the sixth power limit is higher than the fourth power limit), as compared to the allocation of power according to the second power ratio PR2. Thus, as the power allocation to the first electric machine 20 decreased, the power allocation to the second electric machine 30 increases.

Thus, the allocated power between the first and second electric machines 20, 30 varies over time during the gear change, in accordance with the first, second and third power ratio PR1, PR2, PR3. The controlling apparatus 11 may be configured to control the operation of the first and second electric machines 20, 30. For example, the controlling apparatus 80 may be configured to perform at least a part of the gear shifting operation previously described, such as e.g. the speed synchronization of the first electric machine 20.

Figure 5:
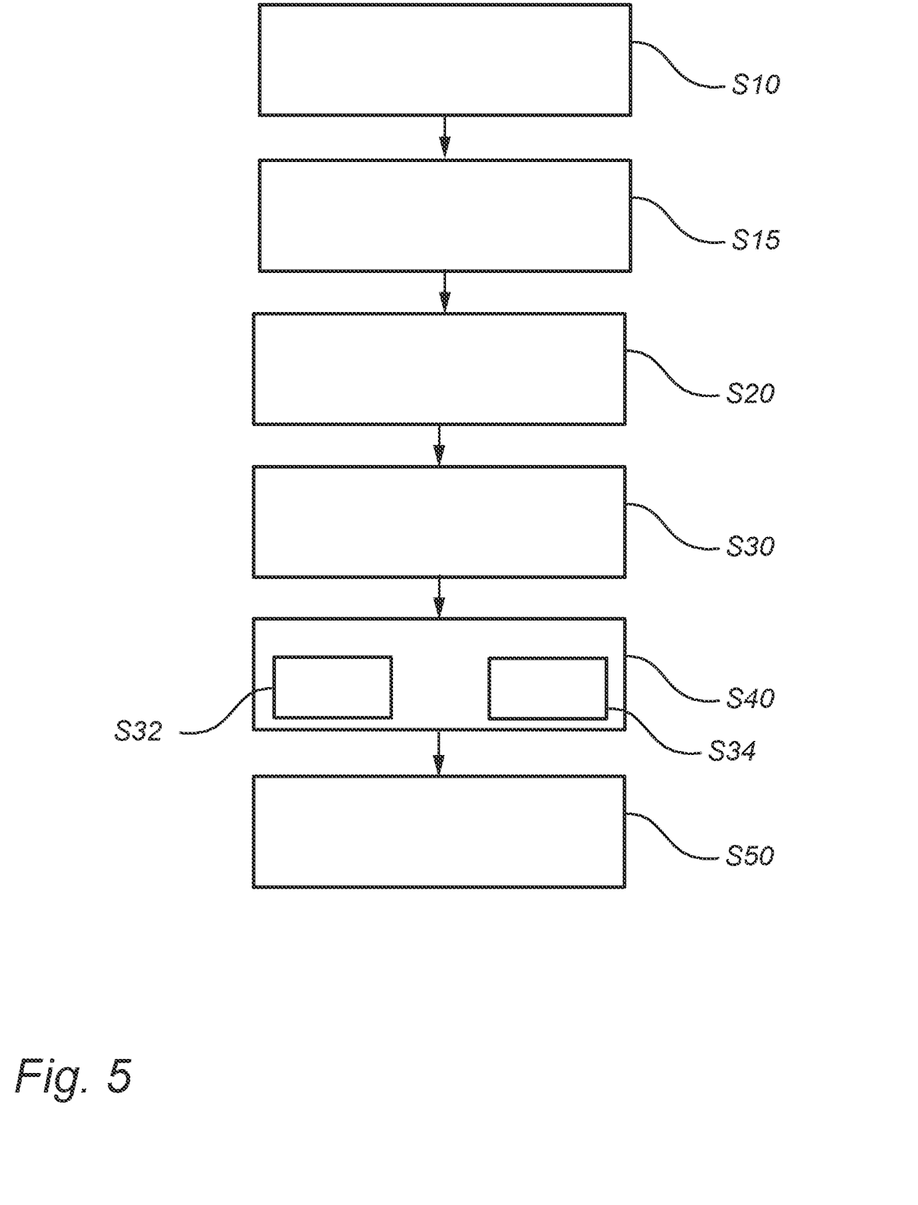
FIG. 5 is a flowchart illustrating the steps of a method in accordance with one example embodiment of the invention.

A method for allocating power between electric machines in a powertrain of an electric vehicle, such as e.g. the first and second electric machines 20, 30 of powertrain 10 of FIG. 2 (which e.g. may be implement as the powertrain 100 of the vehicle 1 of FIG. 1) will now be described in more general terms with reference to the flow chart of FIG. 5. The electric vehicle comprises a gearbox having an input shaft and an output shaft configured to transmit a first torque to the wheels of the vehicle, a first electric machine having an output shaft coupled to the input shaft of the gearbox, and a second electric machine configured to supply a second torque to wheels of the vehicle, such as described for the powertrain 10 of FIG. 2. Thus, the second electric machine may be configured to supply the second torque to the wheels of the vehicle without being coupled to the input shaft of the gearbox.

In a step S10, e.g. being a first step S10, being performed prior to a gear change of the first electric machine, power is allocated to the first and second electric machines according to a first power ratio. The first power ratio may e.g. be that described with reference to FIGS. 3 and 4.

In a step S20, e.g. being a second step S20, being performed in response of an intended gear change of the first electric machine, power is allocated to the first and second electric machines according to a second power ratio. The second power ratio is defined by a reduced allocation of power to the first electric machine and an increased allocation of power to the second electric machine, or an increased allocation of power to the first electric machine and a decreased allocation of power to the second electric machine, as compared to the allocation of power according to the first power ratio. The second power ratio may e.g. be that described with reference to FIGS. 3 and 4. For example, the second power ratio may be determined by the amount of power needed for propelling the vehicle and/or by the amount of power needed for performing the gear change. Thus, either the amount of power needed for propelling the vehicle may be decisive for the second power ratio, or the amount of power needed for performing the gear change of the first electric machine is decisive for the second power ratio. For the latter, the amount of power needed for performing the gear change may be determined by the speed synchronisation required for performing the gear change, and the allocated time for performing the speed synchronisation. The allocated time for performing the speed synchronisation may be driver-desired time. The allocated time for performing the speed synchronisation may alternatively be determined in response to the power needed for propelling the vehicle, such that for a relatively high power needed for propelling the vehicle, the allocated time for performing the speed synchronisation is relatively short, and for a relatively low power needed for propelling the vehicle, the allocated time for performing the speed synchronisation is relatively long.

The allocation of power according to the second power ratio may be determined in different ways. In a step S30, e.g. being a third step S30, it is determined whether the intended gear change is an upshift or a downshift. In principle, the third step S30 may be performed prior to the second step S20, whereafter it has been determined whether the gear shift is an upshift or a downshift, the power allocation according to the second power ratio is performed.

Depending on if the intended gear change is an upshift or a downshift, different actions may be taken. For example, in response of that the intended gear change is a downshift, the output shaft of the first electric machine is accelerated S32 to reach the higher speed of the output shaft of the gearbox (for speed synchronization). During such acceleration, the power used for the acceleration of the output shaft of the first electric machine is limited by the allocated power according to the second power ratio. Such acceleration of the output shaft of the first electric machine during the gear shift operation is e.g. described with reference to FIGS. 3 and 4.

According to an alternative example embodiment, in response of that the intended gear change is an upshift, the output shaft of the first electric machine is decelerated S34 to reach a lower speed of the output shaft of the gearbox, wherein the deceleration of the first electric machine is assimilated as regenerative power. Thus, instead of allocating power for propulsion or power needed for a gear change, the allocated power may refer to available or possible power outtake (i.e. regenerative power). The corresponding power allocation for power regeneration may apply to the second electric machine during braking of the vehicle, performed simultaneously of the gear change of the first electric machine.

The allocation of power to the first and second electric machines according to the second power ratio may be determined in response to the maximum possible power throughput of the first and second electric machines. Thus, the power allocation according to the second power ratio is at least limited to the amount of power the first and second electric machines can use or generate. For example, if the first electric machine only can use (or generate) 70% of the available power (for the first and second electric machines), there is no need to allocate more power than this. The maximum possible power throughput of the first and second electric machines may limit the allocation of power for the first and second electric machines, respectively.

In a step S40, e.g. being a fourth step S40, a gear change of the first electric machine is performed. The gear change is e.g. a downshift as described with reference to FIGS. 3 and 4, or it is an upshift. Thus, the fourth step S40 typically comprises the step of acceleration S32 of the output shaft of the first electric machine, and/or the step of deceleration S34 of the output shaft of the first electric machine, as previously described.

In a step S50, e.g. being a fifth step S50, being performed subsequent to the gear change S40, power is allocated to the first and second electric machines according to a third power ratio. The third power ratio is defined by an increased allocation of power to the first electric machine and a decreased allocation of power to the second electric machine, or a decreased allocation of power to the first electric machine and an increased allocation of power the second electric machine, as compared to the allocation of power according to the second power ratio. The third power ratio may e.g. be that described with reference to FIGS. 3 and 4.

According to at least one example embodiment, the step S20 of allocating power to the first and second electric machines according to the second power ratio is preceded by the optional step S15 of estimating required amount of power needed for propelling the vehicle and required amount of power needed for performing the gear change. Hereby, the step S20 of allocating power to the first and second electric machines according to the second power ratio may be performed in response to determining that the required amount of power is limited in relation to available power. Thus, allocation of power to the first and second electric machines may be performed once the available power is limited. The available power typically refers to the available power of the battery 14 as described with reference to FIG. 2, or at least the available power of the battery 14 assigned to the first and second electric machines.

According to at least one example embodiment, the controlling apparatus 11 of FIG. 2 is configured to perform the method as described with reference to FIG. 5. The method as described with reference to FIG. 5 may be implemented in a computer program. Thus, the computer program may comprise program code means for performing the method as described with reference to FIG. 5, when the program is run on a computer. Alternatively the method as described with reference to FIG. 5 may be implemented in a computer readable medium carrying a computer program comprising program code means for performing the method as described with reference to FIG. 5, when the computer program is run on a computer. Thus, the program code means may comprise instructions to cause the powertrain (e.g. the battery 14 and the first and second machine drivers 22, 32 described with reference to FIG. 2) to execute at least some of the steps described with reference to FIG. 5.

It should be noted that the naming of the steps not necessarily, but might according to at least one example embodiment, relate to the order in which the steps are carried out. Thus, the order of the steps may be different than that explained here, and the controlling apparatus 17 of FIG. 2 may be configured to carry out one or several of the steps. Moreover, one or more of the steps may be combined and carried out simultaneously.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for allocating power between electric machines in a powertrain of an electric vehicle, wherein the electric vehicle comprises a gearbox having an input shaft and an output shaft configured to transmit a first torque to wheels of the vehicle, a first electric machine having an output shaft coupled to the input shaft of the gearbox, and a second electric machine configured to supply a second torque to the wheels of the vehicle, the method comprising: prior to a gear change of the gearbox, allocating power from a power source to the first and second electric machines according to a first predefined power ratio; in response of an intended gear change of the gearbox, allocating power from the power source to the first and second electric machines according to a second predefined power ratio, wherein the second predefined power ratio is defined by a reduced allocation of power to the first electric machine and an increased allocation of power to the second electric machine, or an increased allocation of power to the first electric machine and a decreased allocation of power to the second electric machine, as compared to the allocation of power according to the first predefined power ratio.

2. The method according to claim 1, further comprising: determining whether the intended gear change is an upshift or a downshift;
in response of that the intended gear change is a downshift, accelerating the output shaft of the first electric machine to reach a higher speed of the output shaft of the gearbox, wherein the power used for the acceleration is limited by the allocated power according to the second predefined power ratio.

3. The method according to claim 2, further comprising:
in response of that the intended gear change is an upshift, decelerating the output shaft of the first electric machine to reach a lower speed of the output shaft of the gearbox, wherein the deceleration of the first electric machine is assimilated as regenerative power.

4. The method according to claim 1, further comprising: performing a gear change of the gearbox; subsequent to the gear change, allocating power from the power source to the first and second electric machines according to a third predefined power ratio, wherein the third predefined power ratio is defined by an increased allocation of power to the first electric machine and a decreased allocation of power to the second electric machine, or a decreased allocation of power to the first electric machine and an increased allocation of power the second electric machine, as compared to the allocation of power according to the second predefined power ratio.

5. The method according to claim 1, wherein the second predefined power ratio is determined by the amount of power needed for propelling the vehicle and/or by the amount of power needed for performing the gear change.

6. The method according to claim 5, further comprises:
estimating required amount of power needed for propelling the vehicle and required amount of power needed for performing the gear change;
in response to determining that the required amount of power is limited in relation to available power, performing the step of allocating power to the first and second electric machines according to the second predefined power ratio.

7. The method according to claim 5, wherein the amount of power needed for performing the gear change is determined by the speed synchronisation required for performing the gear change, and the allocated time for performing the speed synchronisation.

8. The method according to claim 7, wherein the allocated time for performing the speed synchronisation is determined in response to the power needed for propelling the vehicle, such that for a relatively high power needed for propelling the vehicle, the allocated time for performing the speed synchronisation is relatively short, and for a relatively low power needed for propelling the vehicle, the allocated time for performing the speed synchronisation is relatively long.

9. The method according to claim 1, wherein the allocation of power to the first and second electric machines according to the second predefined power ratio is determined in response to the maximum possible power throughput of the first and second electric machines.

10. The method according to claim 1, wherein the second electric machine is configured to supply the second torque to the wheels of the vehicle without being coupled to the input shaft of the gearbox.

11. A controlling apparatus for a powertrain of an electric vehicle, the controlling apparatus being configured to carry out the method for allocating power between electric machines in a powertrain of an electric vehicle according to claim 1.

12. A powertrain of an electric vehicle comprising the controlling apparatus of claim 11, and a gearbox having an input shaft and an output shaft configured to transmit a first torque to the wheels of the vehicle, a first electric machine having an output shaft coupled to the input shaft of the gearbox, and a second electric machine configured to supply a second torque to wheels of the vehicle.

13. An electric vehicle comprising a controlling apparatus according to claim 11.

14. A non-transitory computer readable medium carrying a computer program comprising program code for performing the method according to claim 1, when the program code is run on a computer.

* * * * *